United States Patent Office 2,977,630
Patented Apr. 4, 1961

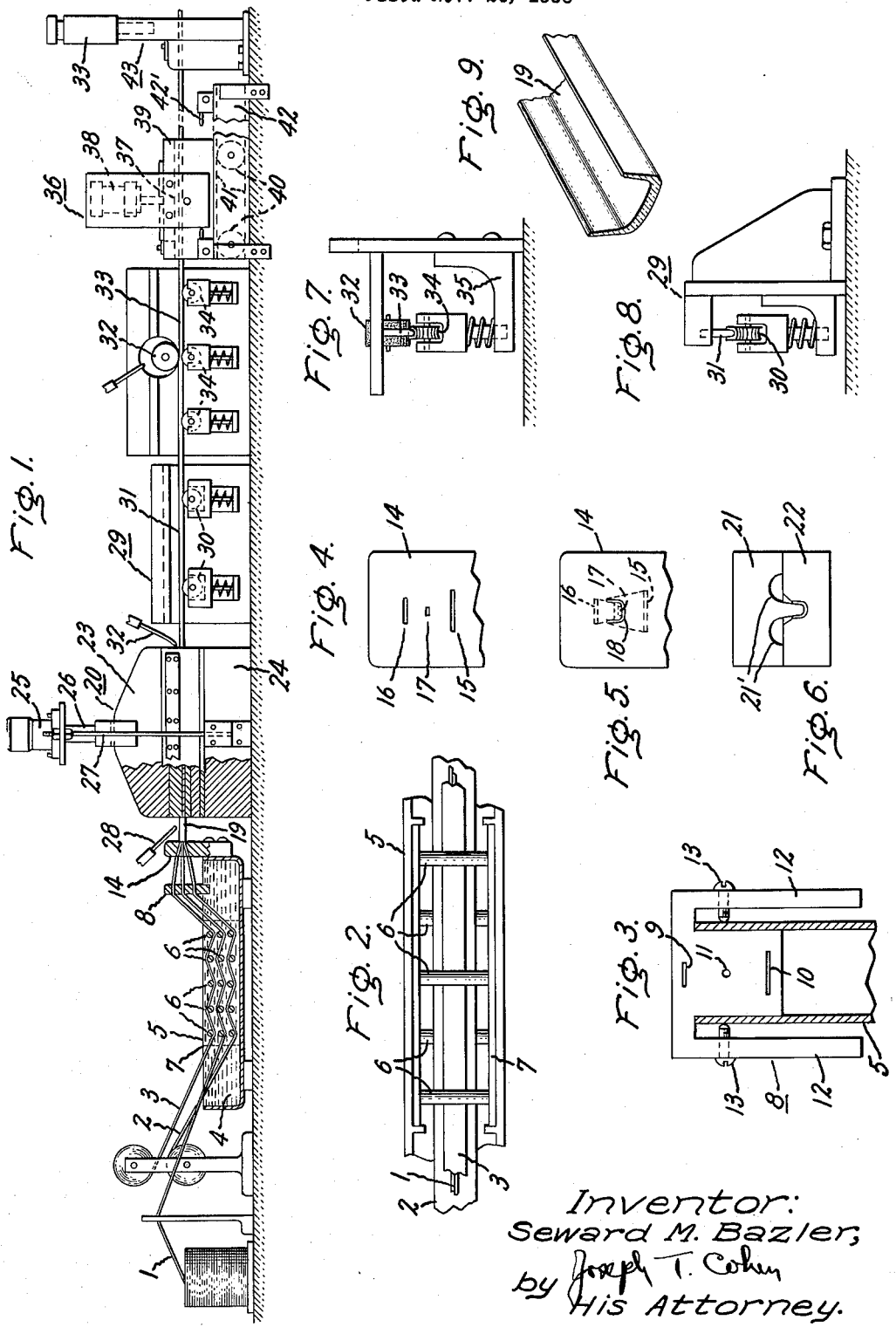

2,977,630

PRODUCTION OF CONTINUOUS LAMINATED STRIPS

Seward M. Bazler, Coshocton, Ohio, assignor to General Electric Company, a corporation of New York Filed Nov. 26, 1956, Ser. No. 624,271

8 Claims. (Cl. 18—4)

This invention relates to a process and apparatus for the production of continuous laminated strips and to the articles produced thereby. More specifically, this invention relates to a process and apparatus for producing under heat and pressure, in a substantially automatic operation, a continuous shaped laminated strip of substantially uniform cross-sectional configuration and to the articles produced thereby.

Heretofore, it has not been possible to produce continuous lengths of laminated strips when the laminated strips had contoured or shaped portions of relatively thin cross-sectional dimensions. The reason for this is that the production of these strips generally necessitates a tensioning device to pull the filler material, from which the strips are made, through the sequential steps of the process. If the laminated strip contains cross-sectional surfaces of relatively thin dimensions, the filler material must be cured in a mold to maintain its configuration and, consequently, the increased tension necessary to pull the material through the mold will rupture the filler material. Thus, for example, it is known to produce continuous lengths of solid glass rods; however, shaped laminates with portions of relatively thin dimension have heretofore been produced commercially only in discontinuous lengths.

One method of overcoming the above difficulties would be to produce the shaped strips in continuous lengths by a discontinuous process, i.e., a so-called "step molding" process. Such a process would involve an intermittent advance of the filler material through a resin immersion bath and a mold. The molding step itself would take place only when the resin-immersed filler material is stationary. Thus, the tension necessary to pull the filler material through the sequence of operations would be minimized because the mold would be open during the period when the filler material is advanced. However, in such an operation, those portions of the laminate strip adjacent the terminal portions of the mold are generally unevenly impregnated or coated with resin. The result is that these terminal portions must either be eliminated or, if ground to size, nonuniform physical and electrical properties result in the laminate. In addition, the accumulation of resin at the entrance of the mold forms an agglomerate on the filler material which renders it difficult, if not impossible, to close the mold satisfactorily after that portion of the unmolded filler material is placed within the mold cavity.

It is therefore a primary object of this invention to produce continuous lengths of shaped laminated strips having uniform physical and electrical properties throughout.

It is another object of this invention to eliminate waste resulting from resin buildup or flash on molded strips and waste resulting from elimination of uneven portions of the strip.

It is an additional object of this invention to produce the aforementioned strips in a substantially automatic operation by the provision of a novel combination of mechanical means which act in unison to produce the continuous laminates of this invention.

In accordance with this invention, it has been discovered that the above objects may be achieved by advancing the filler material stepwise through a series of operations including impregnating, coating or otherwise treating the filler material with a resin, and, while the resin-treated filler material is temporarily stationary, molding a segment of said resin-immersed filler material under heat and pressure. A critical feature of this invention resides in the utilization of a gaseous jet, such as air, nitrogen or other relatively inexpensive and nonreactive gas, adjacent the entrance end of the mold. It has been found that the utilization of a gaseous jet at the entrance end of the mold functions to eliminate the uneven resin content of the laminate strip adjacent the entrance end of the mold. This results from the fact that the gaseous jet displaces excess resin from the material entering the mold, i.e., the so-called flash or squeeze-out, resulting from the pressure applied from the mold. In addition, the gaseous jet cools both the entrance end of the mold itself and the material adjacent the entrance end of the hot mold between heats (or molding cycles) so that the resin does not cure prior to entering the mold.

In some instances it has also been found desirable to include an additional gaseous jet at the exit end of the mold. The gaseous jet at the exit end of the mold performs the function of keeping the resin cool until the succeeding loading into the mold is finished and the molding pressure is applied to the segment of the laminated strip being molded. This prevents cure of the resin prior to the application of pressure in that portion of the strip which is in the mold.

Briefly stated, the process of this invention involves the steps of intermittently advancing filler material treated with a resin into a mold and molding a stationary segment of said resin-treated filler material under heat and pressure while simultaneously directing a gaseous stream at the entrance of the mold to prevent undesirable accumulation and hardening of resin at the mold entrance.

The apparatus of this invention comprises means for treating filler material with a resin, a mold for molding the resin-treated filler material under heat and pressure into a laminated strip, means for directing a gaseous stream at the entrance end of the mold, and means for advancing or pulling the laminated strip through the treating means and the mold.

My invention will be more clearly understood from the following description taken in connection with the accompanying drawing in which:

Fig. 1 is a side elevation, partly in cross section, showing one means of carrying out my invention.

Fig. 2 is a plan view of a removable bracket placed in the dip tank shown in cross section in Fig. 1.

Fig. 3 is a front elevation of the wiper guide shown in cross section in Fig. 1.

Figs. 4 and 5 are rear and front elevations, respectively, of the preform guide shown in cross section in Fig. 1.

Fig. 6 is an end view of the male and female portions of the mold shown in Fig. 1.

Fig. 7 is a front elevation of the grinder shown in Fig. 1.

Fig. 8 is a front elevation of the cooling form shown in Fig. 1.

Fig. 9 is a perspective view of a portion of a laminated strip produced in accordance with this invention.

In the following description, the process will be described with reference to the preparation of a U-shaped motor slot wedge from a filler material of glass tape and glass roving using a polyester resin as the binder. The polyester resin used was an unsaturated polyester manufactured by Rohm and Haas Co., Philadelphia, Pa., and consisting, by weight, of 70 percent of a polyester sold under the designation P-43 and 30 percent, by weight, of a polyester sold under the designation P-13. The P-43 polyester is believed to be a propylene glycol adipate and maleate containing styrene and has the following properties: viscosity 2000–2400 cps., specific gravity 1.143–1.153, refractive index 1.5362, maximum acid number 35. The P-13 polyester is believed to be a propylene glycol maleate and phthalate containing styrene and has the following properties: viscosity 300–500 cps., specific gravity 1.01–1.03, refractive index 1.5128, maximum acid number 5. One percent of a benzoyl peroxide catalyst was used.

Referring to Fig. 1, it can be seen that glass roving 1 and glass tapes 2 and 3 are unrolled and immersed in the polyester resin 4 contained in a dip tank 5. The glass roving 1 is a 60 end roving, while the glass tapes 2 and 3 are 7 mils thick, tape 2 being ¾ inch wide and tape 3 being ½ inch wide, both having been heat cleaned. To obtain optimum saturation, the glass filler is threaded over and under bars 6 on a removable bracket 7 more clearly shown in Fig. 7. The saturated glass is then fed through wiper guide 8, which aligns the glass into a sandwich construction consisting of top tape 3, bottom tape 2, and inside roving 1. As shown in Fig. 3, the wiper guide 8 consists of slots 9 and 10 for top and bottom tape and circular opening 11 for the roving. The guide is mounted on tank 5 and held in place by legs 12 and bolts 13. The impregnation time used for the production of this particular strip varied between 3 and 6 minutes.

The properly aligned, resin-treated glass is next pulled through a preforming guide 14, which forms the resin-treated glass into a shape similar to that of the finished product. As can be seen in Figs. 4 and 5, the front portion of the preform guide 14 is composed of slots 15 and 16 for tapes 2 and 3, respectively, and narrower slot 17 for roving 1. At the exit end of the preform guide, the three slots have converged to form U-shaped slot 18, similar to the final contour of the laminated strip. Although a preforming guide was used in the particular embodiment here illustrated, it has been found that preforming means may be dispensed with and the resin-immersed filler material may be led directly from the immersion tank to the mold after excess resin has been removed.

After emerging from the exit end of the preform guide 14, the shaped article 19 is pulled into the mold 20 between a male mold 21 and a female mold 22 shown in greater detail in Fig. 6. Mold 20 consists of a header 23 attached to the male mold 21, and a mold support 24 supporting the female mold 2. Pressure for the mold is supplied by an air cylinder 25 through a piston shank 26 attached to header 23. Air cylinder 25 is supported on mold support 24 by means of two supporting legs 27. Male mold 21 is also provided with flash reservoirs 21' for accumulation of flash during molding. A gaseous stream of, e.g., air, is directed by air jet 28 at the shaped and resin-treated article 19 adjacent the entrance end of the mold. This gaseous jet prevents the resin adjacent the entrance end of the mold from curing until it actually enters the mold and is subjected to pressure. It also prevents the resin, which squeezes out when the mold closes, from building up on the portion of shaped article 19 adjacent the entrance of the mold which in turn would interrupt the continuity of the product. In addition, it functions to cool the entrance end of the mold. It should be noted that the resin at this point in most cases is still an A stage or liquid resin and thus substantial flash results. Air pressure required for the above step is small, in the neighborhood of 3 p.s.i. in this particular example.

The mold is heated, in this case electrically by Calrod units, to a temperature of approximately 140° C. The total pressure applied in the mold is about 1200 p.s.i. In place of electrically heating the mold, other conventional methods of heating may be used, as, for example, steam, circulating liquids, etc. Pressure is supplied by air cylinder 25 but other forms of pressure, such as hydraulic pressure, may be used. The temperature and pressure will, of course, vary with the type of resin used, filler material employed, the end product desired, etc. After remaining in the closed mold for the time required in the molding operation, e.g., from about 5 to 60 seconds or more, the mold is opened and shaped article 19 is advanced to the cooling form 29. The mold is preferably opened only a very short distance, for instance, about ½ inch, so as to prevent, as much as possible, flash from the flash reservoir from entering the mold cavity. Shaped article 19 is now pulled onto cooling form 29, article 19 being held in place by supporting wheels 30 and runner 31. The cooling frame is long enough to hold that length of strip dictated by the stroke of the pulling equipment, in this case approximately 35½ inches.

An air jet 32 at the exit end of the mold supplies a stream of air to the surface of the uncured resin-immersed article 19 as it is pulled into the mold cavity and before the mold is closed. This air supply is advantageously activated only during the loading period in the mold and prevents the resin on the laminate from curing during the loading operation, allowing the resin to be in a fluid, free-flowing state when pressure is applied. The air pressure for this step is likewise small, of the order of 6 p.s.i. This air stream may be eliminated if the speed of the operation is sufficient to preclude the possibility of the resin's curing during the interval during which the impregnated filler is drawn into the molding cavity.

After being postformed on cooling form 29, molded article 19 is pulled through a grinder 32 where residual flash and excess material are removed from the upper surface of the legs of shaped article 19 and ground to size. Grinder 32, shown more clearly in Fig. 7, may be actuated in any conventional fashion. Article 19 is held in place during the grinding step by a runner 33 and the spring loaded wheels 34 held in place by an L-shaped supporting arm 35. Pulling force employed for advancing the laminate through the various operations is provided by a puller 36. Puller 36 consists of a contoured clamp 37 with clamping force furnished by an air cylinder 38. The clamp is carried by a cart 39 running on wheels 40 which runs on a rail section 41. The cart 39 is pulled along the rails by an air operated piston 42. An arm 42' at the end of the puller activates a guillotine cutter 43.

The finished continuous length of laminated strip or article 19 may be cut into desired lengths by air-operated guillotine cutter 43. The contoured cutting die (not shown) is powered by an air cylinder 33. The cut-off is activated at the end of each moulding cycle and provides a molded product having a length slightly less than the length of the mold. Thus, when, for instance, the length of the mold is 36 inches, an overlap of approximately ½ inch is allowed in the mold to provide a uniform strip in spite of intermittent molding.

The operation of the apparatus is so interconnected that upon the opening of the mold 20, the puller clamp 37 is activated to grasp article 19. In succession, the air operated piston 42 of the puller 36 is activated causing the cart 39 to move to the end of its stroke. The arm 42' at the end of puller 36 activates the guillotine cutter 43 and the pressure on puller 36 is then released so that the cart 39 returns to its former position. In the meantime, while article 19 was moving forward, the impregnated tape and rovings were drawn into the mold. When puller 36 reaches the end of its stroke, the air cylinder 25 on the mold 20 is activated and closes male portion 21 on female portion 22 and cure is started. It can thus be seen that continuous homogeneous lengths of laminated strips may be produced in a substantially automatic operation.

The preferred form of filler material useful in the practice of this invention is roving and tape of glass fiber. However, it should be understood that other filler materials may be used and are intended to be included within the scope of this invention. Thus, for example, Orlon fibers—Du Pont trademark for its acrylic fiber, Dacron fibers—Du Pont trademark for its polyester fiber, nylon or any similar synthetic fiber may be substituted for glass fiber to produce the continuous molded strips of this invention. Similarly, paper-type or cellulosic filler materials may also be used, as well as asbestos mat or cotton. In addition, the laminates may be comprised of a combination of the foregoing filler materials, such as glass fiber and asbestos, or polyester tapes and asbestos, or a combination of glass fibers and Dacron, nylon or Orlon.

The resinous material used for impregnating or coating the filler material may be any resinous binder, either thermosetting or thermoplastic, but preferably thermosetting. In the specific example given above, a thermosetting unsaturated polyester resin was employed. However, other resins and, in particular, other conventional thermosetting laminating resins, may be used, as, for example, alkyd resins, oil-modified alkyd resins, phenolic, melamine, urea, epoxy and silicone resins, mixtures of the foregoing resins with each other, etc.

The apparatus and process of this invention are particularly useful for the production of continuous lengths of shaped laminated strips having high strength and excellent electrical properties. A multiplicity of possible contours or shapes in the laminated strips may be produced, including channelled or angled strips, or strips having a thin rectangular shaped cross-sectional outline. The process is also useful for heavier cross-sectional strips which contain granular filler material as a partial replacement for the continuous glass roving or other continuous filler. Strips containing a significant percentage of granular filler material must ordinarily be molded while the strip material is stationary and thus may be produced in continuous lengths in accordance with this invention. In addition, this invention also finds utility in the production of heavier strip material, rectangular, circular or elliptical in cross section, which would warp or bend in ordinary horizontal continuous molding operations.

The times, temperatures and pressures may be varied over wide limits, depending upon the product being produced, the resin employed and the use for which the product is intended. The molding pressures are chiefly governed by the degree of force necessary to mold the strip and may range from about 15 p.s.i. to as high as is necessary to achieve the desired configuration and properties of the final product. It will generally be found that the pressure of the gaseous jets used at the entrance and the exit ends of the molds may be of small magnitude, such as 3 to 6 pounds per square inch, the pressure at the exit end being generally greater than that at the entrance. However, depending upon the viscosity of the resin, mold temperature, and on the particular filler material being used, this pressure may be greater or less as required. In general, this pressure will be that sufficient to displace resin squeezed out from the mold and to prevent resin accumulation. The temperature of the gaseous jet will ordinarily be room temperature but may vary as long as it is substantially below the temperature of the mold so that hardening of the resin is prevented.

The continuous laminates of this invention are useful for a wide variety of general commercial and electrical applications. They may be used for contoured and lightweight structural parts for automobiles or airplanes, as slot wedges in motors, structural members in transformers and in a wide variety of other electrical applications.

What I claim as new and desire to secure by Letters Patent of the United States is:

1. A process for producing a continuous molded laminated strip of substantially uniform cross-sectional configuration which comprises intermittently advancing filler material treated with a resin into a mold and molding a stationary segment of said resin-treated filler material under heat and pressure while simultaneously directing a gaseous stream at the entrance of the mold and at the resin treated filler material outside of the mold while said resin is in a fluid, free flowing state before it enters the mold to prevent undesirable accumulation and hardening of resin at the mold entrance.

2. A process for producing a continuous molded laminated strip of substantially uniform cross-sectional configuration, which comprises intermittently advancing filler material impregnated with a thermosetting binding resin into a mold, molding a stationary segment of said resin-impregnated filler material under heat and pressure while simultaneously directing a gaseous stream at the entrance end of the mold and at the resin treated filler material outside of the mold while said resin is in a fluid, free flowing state before it enters the mold to prevent undesirable accumulation and hardening of resin at the mold entrance, and directing a second stream of air into the mold at the resin-impregnated filler material as it is drawn into said mold.

3. A process for producing a continuous molded laminated strip of substantially uniform cross-sectional configuration which comprises intermittently advancing glass fiber filler material impregnated with a thermosetting polyester resin into a mold, and molding a stationary segment of said resin-impregnated glass fiber filler under heat and pressure while simultaneously directing a stream of air at the entrance end of the mold and at the resin treated filler material outside of the mold while said resin is in a fluid, free flowing state before it enters the mold to prevent undesirable accumulation and hardening of resin at the mold entrance.

4. A process for producing a continuous molded laminated strip of substantially uniform cross-sectional configuration which comprises advancing filler material intermittently through a series of steps comprising impregnating the filler material with a thermosetting binding resin, removing excess resin, preforming the resin-impregnated filler material into a substantially uniform cross-sectional configuration, directing a stream of air at the entrance end of the mold and at the resin-impregnated filler material adjacent the entrance of the mold and at the resin treated filler material outside of the mold while said resin is in a fluid, free flowing state before it enters the mold to prevent undesirable accumulation and hardening of resin at the mold entrance, directing a second stream of air into the mold at the resin-impregnated filler material as it is drawn into said mold, molding the resin-impregnated filler material under heat and pressure into a laminated strip, cooling the laminated strip and grinding the laminated strip to remove residual flash and excess material.

5. A process for producing a continuous molded U-shaped motor slot wedge of substantially uniform cross-sectional configuration which comprises intermittently advancing glass fiber filler material impregnated with a thermosetting polyester resin into a mold, molding a stationary segment of said resin-impregnated glass fiber filler under heat and pressure into a U-shaped motor slot wedge while simultaneously directing a stream of air at the entrance end of the mold and at the resin treated filler material outside of the mold while said resin is in a fluid, free flowing state before it enters the mold to prevent undesirable accumulation and hardening of the resin at the mold entrance and grinding the molded slot wedge to remove residual flash and excess material.

6. Apparatus for producing a continuous molded laminated strip of substantially uniform cross-sectional configuration comprising means for treating filler material with a resin, a mold for molding the resin-treated filler material under heat and pressure into a laminated strip, means for directing a gaseous stream at the entrance end of the mold and at the resin treated filler material outside of the mold while said resin is in a fluid, free flowing state before it enters the mold, and means for advancing the laminated strip through the treating means and the mold.

7. Apparatus for producing a continuous molded laminated strip of substantially uniform cross-sectional configuration comprising means for impregnating filler material with a thermosetting resin, means for removal of excess resin, a mold for molding the resin-impregnated filler material under heat and pressure into a laminated strip, a gaseous jet at the entrance end of the mold and at the resin treated filler material outside of the mold while said resin is in a fluid, free flowing state before it enters the mold, a second gaseous jet for directing a gaseous stream into the mold at the resin-impregnated filler material as it is drawn into said mold and means for advancing the laminated strip through the impregnation means, the means for removal of excess resin and the mold.

8. Apparatus for producing a continuous molded laminated strip of glass fibers of substantially uniform cross-sectional configuration comprising immersion means for immersing the glass filler material in a thermosetting resin, wiping means for removal of excess resin, a preform guide for preforming the resin-immersed glass filler material into a substantially uniform cross-sectional configuration, a mold for molding the resin-immersed filler material under heat and pressure into a laminated strip, an air jet for directing air at the entrance end of the mold and at the resin treated filler material outside of the mold while said resin is in a fluid, free flowing state before it enters the mold, a second air jet for directing air into the mold at the resin-immersed filler material as it is drawn into said mold, a cooling form for cooling the laminated strip, a grinder for removal of residual flash and excess material and advancing means for pulling the laminated strip through said immersion means, wiping means, preform guide, mold, cooling form and grinder.

References Cited in the file of this patent
UNITED STATES PATENTS

| | | |
|---|---|---|
| 1,321,517 | Frederick | Nov. 11, 1919 |
| 1,471,906 | Longren | Oct. 23, 1923 |
| 1,549,338 | Tompkins | Aug. 11, 1925 |
| 1,619,734 | Jeppson et al. | Mar. 1, 1927 |
| 2,334,485 | Ettl | Nov. 16, 1943 |
| 2,348,740 | Jennings et al. | May 16, 1944 |
| 2,489,121 | Collins | Nov. 22, 1949 |
| 2,631,955 | Muskat | Mar. 17, 1953 |
| 2,747,346 | Tigerman et al. | May 29, 1956 |
| 2,818,606 | White | Jan. 7, 1958 |

OTHER REFERENCES

Plastics Engineering Handbook, published in 1954 by John B. Watkins Co., New York, page 634.